United States Patent

Heim et al.

[11] 3,811,121
[45] May 14, 1974

[54] SUPERVISED BATTERY POWER SUPPLY

[75] Inventors: Alan M. Heim, Florham Park; Raymond J. Gonzalez, Rockaway, both of N.J.

[73] Assignee: Baker Industries, Inc., Cedar Knolls, N.J.

[22] Filed: June 23, 1972

[21] Appl. No.: 265,559

[52] U.S. Cl. .................................. 340/249, 320/48
[51] Int. Cl. ........................................... G08b 21/00
[58] Field of Search ...................... 340/249; 320/48

[56] References Cited
UNITED STATES PATENTS
3,447,060  5/1969  Tedd .............................. 340/249 X Primary Examiner—John W. Caldwell
Assistant Examiner—Daniel Myer
Attorney, Agent, or Firm—Edward T. Connors

[57] ABSTRACT

A circuit for indicating the presence or condition of a battery in which the battery is used to control the actuation of an alarm circuit by using current from the battery to actuate an electronic switch. The circuit is operative irrespective of whether or not a battery charger producing a pulsating charging current is connected to the battery.

5 Claims, 1 Drawing Figure

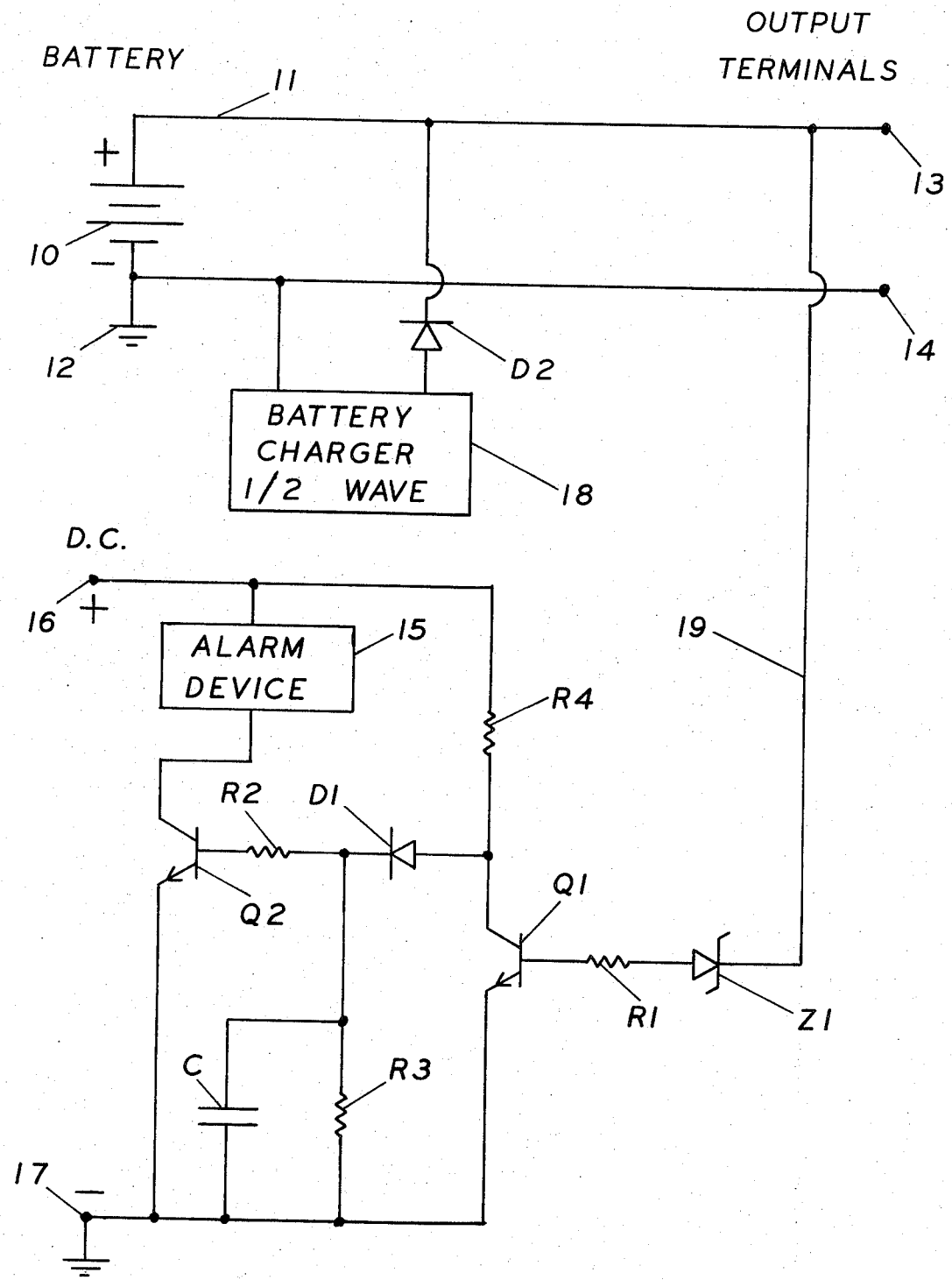

SUPERVISED BATTERY POWER SUPPLY

The present invention relates to a supervised battery power supply circuit particularly suitable for use in a fire alarm system or the like.

It has long been the practice in fire alarm, burglar, and other protective systems operated by electric power systems, to provide back-up, or emergency battery systems, to assure operation of the protective system in the event of an outage of the main electric power system. In such systems supervisory circuits have been provided to detect the failure or low voltage of the main electric power system. However, in at least most of such protective systems no consideration has been given to supervision of the presence or condition of the emergency battery power supply. This is of particular concern particularly in cases in which the batteries are located remotely from the alarm panel. Obviously it is very important to know that the batteries are in place, connected to the alarm system, and of adequate terminal voltage.

In accordance with the present invention supervision is had of the presence of batteries connected to the systems thereby providing a trouble or alarm signal if the batteries are removed or if leads connected to the batteries are broken. In addition the system in accordance with the invention produces a trouble signal alarm if the battery voltage drops below a predetermined voltage level needed for supplying power to the system, also the trouble signal is produced in the event of a short in the battery or between battery leads resulting in a reduction of the terminal voltage of the battery.

The construction in accordance with the present invention incorporates a battery, an alarm device, and a control circuit. The battery is connected to electronic switching means in the control circuit so that a minute amount of battery current is used to hold-off actuation of the alarm device powered by a separate source of power. A zener diode is incorporated in the circuit and selected so that in the event the battery voltage drops below the zener voltage the battery ceases to hold off actuation of the alarm device. The circuit is operative irrespective of whether or not the battery is being charged by a battery charger supplying a pulsating current.

The single FIGURE of the drawing shows a schematic circuit in accordance with the invention.

Referring to the drawing there is shown a supervised battery power supply circuit in accordance with the invention and including a battery 10 to be supervised. The battery 10 has a pair of terminals 11 and 12 respectively connected to output terminals 13 and 14, the terminal 12 being grounded. An alarm device 15 may be of any conventional type producing audible or visual signals and adapted to be powered electrically. The control circuit for the alarm device includes a transistor Q1 adapted to be biased normally in the ON condition and to control a second transistor Q2 held normally biased in the OFF condition. The transistor Q2 when ON completes the circuit for the alarm device 15. A direct current control potential is applied to terminals 16 and 17, the negative terminal 17 being grounded. The transistor Q1 is supplied through its base from the battery through lead 19, the zener diode Z1, and the resistor R1. The collector path for the transistor Q1 is supplied through a resistor R4 from the direct current control voltage supply. A blocking diode D1 is connected from the collector of the transistor Q1 through a current limiting resistor R2 to the base of transistor Q2. Connected between the resistor R2 and the diode D1 is a capacitor C by-passed by a discharge resistor R3. A battery charger 18 is connected across the terminals of the battery 10 in series with a blocking diode D2.

In the operation of the circuit under normal conditions the battery 10 may have a voltage of, for example, 24 volts. Normal current flows from the battery 10 through the zener diode Z1 (zener voltage 20 volts), the resistor R1, and the base to emitter junction, returning through ground to the battery terminal 12. This battery current provides a constant base bias to hold the transistor Q1 normally ON. The collector of transistor Q1 is connected to the anode of the diode D1 and holds this point near ground potential which deprives the transistor Q2 of turn on bias current. As long as the battery is present and its voltage is above the zener voltage of zener diode Z1, the transistor Q1 will remain ON and the transistor Q2 will remain OFF and the alarm device 15 will be deenergized. Capacitor C will remain uncharged. This will be the case irrespective of whether or not the battery charger 18 is connected to the battery 10.

When the battery is removed, its leads are opened, or its voltage drops below the zener diode voltage, the transistor Q1 is deprived of bias current and will, assuming the battery charger 18 is connected, receive a half-wave signal from the battery charger 18. The transistor Q1 will be biased ON only during the time duration that the battery charger voltage is greater than the zener voltage. Since the battery charging potential is half-wave a potential less than the zener Z1 voltage will exist for a period of time. During the period that the zener diode Z1 is not conducting the transistor Q1 will turn OFF and the capacitor C will receive a charge through the resistor R4 and the diode D1. The capacitor C will become charged and under this condition provide a constant bias current to keep the transistor Q2 ON and thereby energize the alarm device 15. The circuit will remain in this state until the battery has been replaced, or its potential brought up to a suitable value.

The resistors R1, R2, and R4 are current limiters and the resistor R3 controls the discharge rate of the capacitor C. The diodes D1 and D2 are blocking diodes where the diode D1 prevents the discharge of the capacitor C through the transistor Q1. The diode D2 is used to prevent the discharge of the battery through the charger.

In a working embodiment of a circuit in accordance with the invention the following circuit constants were used:

| | |
|---|---|
| Battery charger | 35 volts peak |
| Direct current control voltage | 35 volts |
| Battery | 24 volts |
| Resistor R1 | 1K ohms |
| Resistor R2 | 1K ohms |
| Resistor R3 | 5K ohms |
| Resistor R4 | 5K ohms |
| Capacitor C | 10 mfd |
| Transistor Q1 and Q2 | NPN |
| Zener diode Z1 | 20 volts |

While the invention has been described and illustrated with reference to a specific embodiment thereof it is to be understood that other embodiments may be resorted to without departing from the invention. For example, although the supervised power supply has been referred to as a battery, it is to be understood that within the skill of the art other power supplies may be used such as fuel cells, generators, or separate system supplies. Therefore, the form of the invention set out above should be considered as illustrative and not as limiting the scope of the following claims.

We claim:

1. A supervised battery power supply circuit comprising a battery producing a first potential, a pair of output terminals connected to said battery, a pulsating wave battery charger connected to said output terminals and producing a pulsating potential varying in magnitude from at least said first potential to a second potential below said first potential, an alarm device, an alarm power supply, a control circuit connecting said alarm power supply to said alarm device, first switching means in said control circuit normally effective to cause operation of said alarm device, second switching means responsive to output terminal potential for effecting hold-off of said first switching means thereby preventing actuation of said alarm device responsive to output terminal potential above a predetermined value between said first and second potentials and non-responsive to terminal potential below said second potential, and capacitor means charged by said alarm power supply during non-responsive action of said second switching means and effective to hold on said first switching means during pulsations of said battery charger producing terminal potential above said predetermined value of terminal potential whereby the voltage at said output terminals is supervised thereby causing the actuation of an alarm upon the occurrence of an increase in resistance or open circuit of said battery or its leads or upon an undervoltage condition thereof or upon a short circuit of said battery or its leads.

2. A supervised battery power supply circuit according to claim 1 in which said first switching means is a transistor and said second switching means is constructed to normally bias said transistor OFF.

3. A supervised battery power supply circuit according to claim 2 in which said second switching means is a control transistor normally biased into saturation by said output terminal potential above said predetermined value, said control transistor being connected to clamp the bias for said switching transistor for effecting hold-off of actuation of said alarm device.

4. A supervised battery power supply circuit according to claim 3 in which a blocking diode is included to prevent discharge of said capacitor by said control transistor.

5. A supervised battery power supply circuit according to claim 1 in which a zener diode is connected with said second switching means responsive to output terminal potential so that said alarm device is actuated when the output terminal potential is below the zener potential.

* * * * *